US012755445B2

(12) United States Patent
Kang et al.

(10) Patent No.: US 12,755,445 B2
(45) Date of Patent: Oct. 6, 2026

(54) MEMO PROCESSING DEVICE BASED ON AUGMENTED REALITY, SYSTEM, AND METHOD THEREFOR

(71) Applicant: CHANGWON NATIONAL UNIVERSITY INDUSTRY ACADEMY COOPERATION CORPS, Changwon-Si (KR)

(72) Inventors: Chang Soon Kang, Changwon-Si (KR); Su Gyun Lee, Changwon-Si (KR); Myo Jeong Kim, Changwon-Si (KR)

(73) Assignee: CHANGWON NATIONAL UNIVERSITY INDUSTRY ACADEMY COOPERATION CORPS, Changwon-Si (KR)

( * ) Notice: Subject to any disclaimer, the term of this patent is extended or adjusted under 35 U.S.C. 154(b) by 131 days.

(21) Appl. No.: 18/713,055

(22) PCT Filed: Feb. 10, 2022

(86) PCT No.: PCT/KR2022/002051

§ 371 (c)(1),
(2) Date: May 23, 2024

(87) PCT Pub. No.: WO2023/096025

PCT Pub. Date: Jun. 1, 2023

(65) Prior Publication Data

US 2025/0021749 A1 Jan. 16, 2025

(30) Foreign Application Priority Data

Nov. 23, 2021 (KR) ........................ 10-2021-0162617
Dec. 23, 2021 (KR) ........................ 10-2021-0186065

(51) Int. Cl.
*G06F 40/169* (2020.01)
*G06T 11/00* (2006.01)
(Continued)

(52) U.S. Cl.
CPC ............ *G06T 11/00* (2013.01); *G06F 40/169* (2020.01); *G06T 11/60* (2013.01); *G06V 20/20* (2022.01); *G06V 20/46* (2022.01); *G06T 2200/24* (2013.01)

(58) Field of Classification Search
CPC ...... G06F 40/169; G06V 20/20; G06V 20/46; G06T 11/00; G06T 2200/24
(Continued)

(56) References Cited

U.S. PATENT DOCUMENTS

2006/0246957 A1* 11/2006 Lim .................. H04M 1/72436 455/566
2017/0185236 A1* 6/2017 Yang ....................... H04L 51/02
(Continued)

FOREIGN PATENT DOCUMENTS

KR 10-2013-0079962 A 7/2013
KR 10-2013-0082755 A 7/2013
(Continued)

OTHER PUBLICATIONS

International Search Report in corresponding International Application No. PCT/KR2022/002051, dated Aug. 10, 2022 (6 pages).
(Continued)

*Primary Examiner* — Jin Ge
(74) *Attorney, Agent, or Firm* — Osha Bergman Watanabe & Burton LLP

(57) ABSTRACT

The disclosure relates to a memo processing device is configured to include a camera for filming videos, a memo acquisition unit for specifying a subject to which a memo is to be attached in the filmed video and storing the subject and
(Continued)

the memo in a memory, and a memo presentation unit for displaying a memo stored in the memory as an overlay on a screen when the camera faces the subject. The memo processing device may be appropriately adopted by a portable terminal device such as a smartphone, or a mobile device of various kinds, such as Google Glass or a head-mounted display that is worn on the body, such as the head, as appropriate.

11 Claims, 14 Drawing Sheets

(51) Int. Cl.
*G06T 11/60* (2006.01)
*G06V 20/20* (2022.01)
*G06V 20/40* (2022.01)

(58) Field of Classification Search
USPC .......................................................... 345/633
See application file for complete search history.

(56) References Cited

U.S. PATENT DOCUMENTS

| | | | | |
|---|---|---|---|---|
| 2017/0236037 | A1* | 8/2017 | Rhoads | G06F 16/5866<br>382/103 |
| 2018/0330204 | A1* | 11/2018 | Kim | G06T 1/0007 |
| 2019/0124213 | A1* | 4/2019 | Horvath | H04N 1/19594 |
| 2019/0266263 | A1* | 8/2019 | Jiang | G06V 20/20 |
| 2019/0310757 | A1 | 10/2019 | Lee et al. | |

FOREIGN PATENT DOCUMENTS

| | | | |
|---|---|---|---|
| KR | 10-2019-0125567 | A | 11/2019 |
| KR | 10-2020-0077049 | A | 6/2020 |

OTHER PUBLICATIONS

Written Opinion in corresponding International Application No. PCT/KR2022/002051, dated Aug. 10, 2022 (4 pages).

* cited by examiner

MEMO PROCESSING DEVICE BASED ON AUGMENTED REALITY, SYSTEM, AND METHOD THEREFOR

TECHNICAL FIELD

The following description relates to a memo processing device, system, and method that enable filming, copying, and viewing of memos in text or multimedia format based on augmented reality on designated subjects (objects).

BACKGROUND ART

Examples of existing note taking methods include taking notes on notepads (Post-it notes) and attaching them to specific objects, or directly taking notes on objects. However, these note taking methods are exposed to various issues, such as a problem that a notepad may cover a part of an object or an object to which the notepad is attached may be damaged, a problem of environmental damage caused by the use of notepads (papers), a problem that the contents of the notepad cannot be accurately conveyed or verified if the notepad is lost or damaged, and a problem that there is a risk of information leakage due to the disclosure of the content of the written note to an unspecified number of people.

In addition, there is a method that utilizes sensor data such as GPS to take notes based on a specific area and utilizes Geofence technology to identify the place where the note is attached. However, due to the nature of GPS, it is difficult to utilize sensor data in indoor environments and the error range is around 10 meters, so it is difficult to identify the object to take notes.

DISCLOSURE

Technical Problem

An object of the present invention is to provide a note processing device (hereinafter referred to as "memo processing device") based on augmented reality, system, and method thereof that can address the problems of traditional paper-based note taking methods.

Another object of the present invention is to provide a note processing device based on augmented reality, system, and method thereof that can identify objects for note-taking without error, regardless of the external environment, indoors or outdoors.

Another object of the present invention is to provide a note processing device, system, and method thereof that enables one or more users to take notes, share the taken notes, and view the notes.

Technical problems of the present invention are not limited to the technical challenges mentioned above, and other technical challenges not mentioned will be apparent to those skilled in the art from the following description.

Solution to Problem

In order to achieve this purpose, in one general aspect, a memo processing device based on augmented reality includes: a camera configured to film a video; a note acquisition unit configured to specify a subject to which a memo is to be attached in the filmed video and store the subject and the memo in a memory; and a memo presentation unit configured to display the memo stored in the memory in an overlay form when the camera faces the subject.

The memo processing device may include a captioning unit configured to perform image captioning of a video of the subject to which the memo is attached; and a search unit configured to search content of the memo or captioned images.

The memo acquisition unit may specify a subject using a keypoint extraction algorithm.

The memo presentation unit may use a keypoint matching algorithm, and calculate a homography if a degree of matching between a keypoint in a camera frame and a keypoint in one of candidate memos is greater than or equal to a threshold value when the camera faces the subject, and then display an image rendered of the memo as an overlay on a screen.

The memo presentation unit may include a memo list composition part configured to compose a list of memos; and an overlay screen processing part configured to display the memo as an overlay.

The memo may include a Move button. Upon execution of the Move button, the memo may be attached to a video of a newly filmed subject.

The memory may be an internal memory provided in the mobile device or an external memory removably attached to the mobile device.

The mobile device may include a smartphone, Google Glass, and a head-worn display.

In another general aspect, a memo processing system based on augmented reality includes a first mobile device, at least one second mobile device, and a remote server. The remote server includes an API unit configured to communicate with the first and second mobile devices; a captioning unit configured to perform image captioning on filmed videos; and a database configured to store memo data transmitted by the first mobile device. The second mobile device, when facing a designated subject, shares the memo data stored in the database and displays the memo data as an overlay on a screen.

The first mobile device and the second mobile devices may include a camera; a memo acquisition unit configured to specify a subject to which a memo is to be attached in a video filmed by the camera and store the subject and the memo in a database of the remote server; a memo presentation unit configured to display memos stored in the database as an overlay on the screen when the camera faces the subject; and a search unit configured to search the contents of the memo and captioned images.

The memo acquisition unit may specify a subject using a keypoint extraction algorithm. The memo presentation unit may display the memo using a keypoint matching algorithm.

The memo may include a Move button. Upon execution of the Move button, the memo may be attached to a video of a newly filmed subject.

In another general aspect, a memo processing method based on augmented reality, the method of writing a memo, by a mobile device, based on augmented reality and copying and viewing the memo, includes attaching a memo to a designated subject filmed by the mobile device and storing in a storage; and displaying the memo stored in the storage as an overlay when the mobile device faces the subject.

The storage may be a memory provided in the mobile device or a database provided in a remote server. The memo processing method may further include, when a video of the subject to which the memo is attached is stored in the database, displaying as an overlay screen on the screen while sharing the memos stored in the database by another mobile device.

The memo processing method may further include performing image captioning of the video of the subject to which the memo is attached.

The memo processing method may further include moving and attaching the memo attached to the designated subject to another subject.

A subject to which the memo is to be attached may be specified using a keypoint extraction algorithm. The memo may be displayed on a screen using a keypoint matching algorithm.

The displaying of the memo on the screen may include: matching a keypoint in a camera frame with a keypoint in one of candidate memos when the camera of the mobile device faces the subject; determining if a degree of the matching is greater than or equal to a predetermined threshold; calculating, if the degree is greater than or equal to the predetermined threshold, a homography between the keypoint in the camera frame and the keypoint in one of the candidate memos; and displaying an image rendered of the memo as an overlay on a screen according to a result of the calculation.

Effects of Invention

According to the present invention, the contents of the notes taken by a user can be prevented from being disclosed or exposed to an unspecified number of people, thereby improving security by eliminating the risk of information leakage.

According to the present invention, the problem of not being able to convey the contents of a note due to loss or damage of the notepad can be avoided.

According to the present invention, since a note can be left by specifying an object or subject, it has the effect of providing information about the location of an object or subject that conventional simple information sharing methods such as messengers cannot provide. In addition, since it is possible to view the contents of the memo based on augmented reality instead of sensor data and Geofence technology, it is possible to easily and accurately identify the subject (object) providing the note.

According to the present invention, it is possible to reduce the frequency of use of conventional paper notepads, thereby reducing the extent of environmental damage caused by cutting down trees and the like.

BEST MODE FOR IMPLEMENTATION OF THE INVENTION

Figure 1:
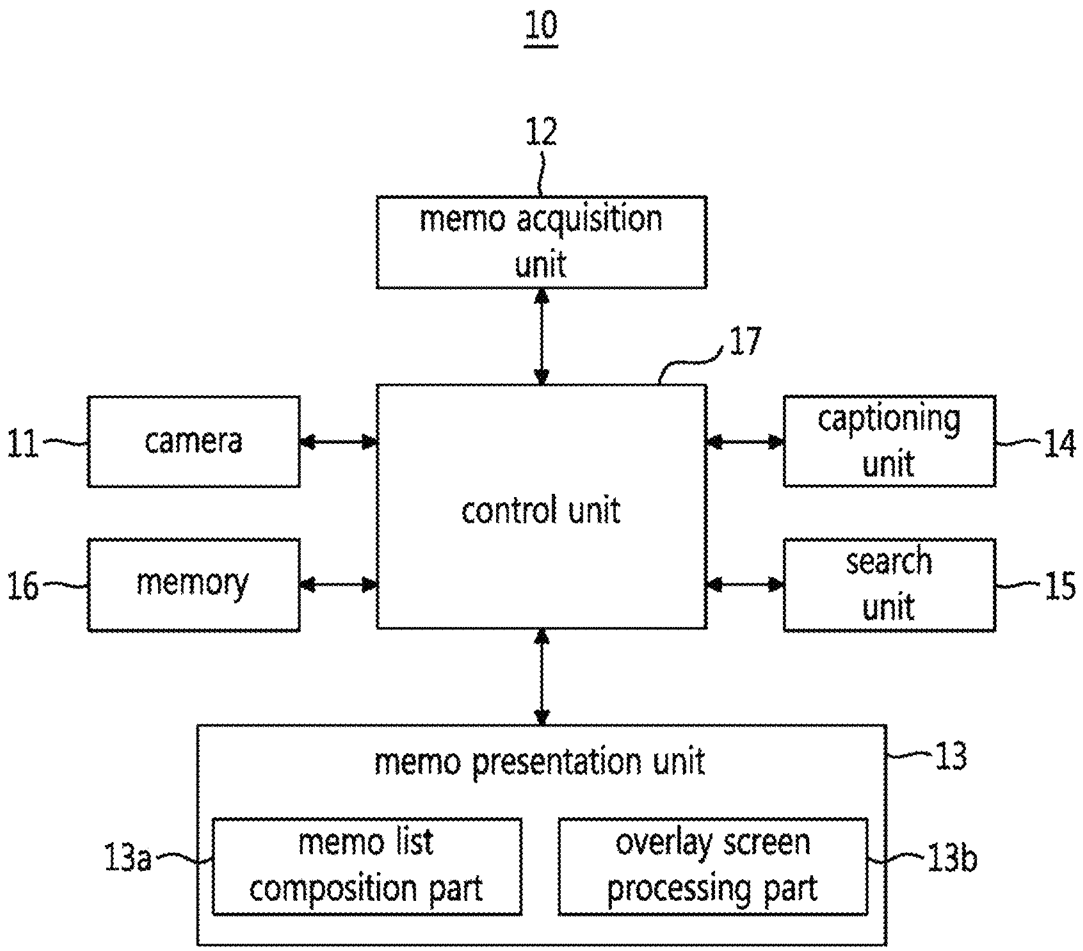
FIG. 1 is a block diagram illustrating a memo processing device based on augmented reality according to a first embodiment of the present invention.

Hereinafter, preferred embodiments of the present invention will be described in detail with reference to the accompanying drawings. Advantages and features of the present invention and a method of achieving them will become apparent with reference to the embodiments described below in detail with the accompanying drawings. However, the present invention is not limited to the embodiments disclosed below, but will be implemented in various different forms, and only the present embodiments are provided to ensure that the disclosure of the present invention is complete, to fully inform those of ordinary skill in the art to which the present invention belongs, and the present invention is only defined by the scope of the claims. Hereinafter, the same reference numerals refer to the same elements.

Although first, second, etc. are used to describe various devices, components, and/or sections, these devices, components, and/or sections are not limited by these terms. These terms are used only to distinguish one device, component, or section from other devices, components, or sections. Therefore, it goes without saying that the first element, the first element, the first element, or the first section mentioned below may be a second element, a second element, or a second section within the technical idea of the present invention.

The terms used in the present invention are used only to describe a specific embodiment and are not intended to limit the present invention. Singular expressions include plural expressions unless the context clearly indicates otherwise. In the present application, the term “comprise” or “made of” is intended to specify that there is a feature, number, step, operation, component, part, or combination thereof described in the specification, and it should be understood not to preclude the presence or additional possibility of one or more other features or numbers, steps, operations, components, parts, or combinations thereof.

As shown in the drawing, spatially relative terms such as lower, lower, upper, and the like may be used to easily describe correlations between one element or component and other elements or components. The spatially relative term should be understood as a term including different directions of the element when used or operated in addition to the direction shown in the drawing. For example, when an element shown in the drawing is turned over, the element described as below or below the other element may be placed above the other element. Accordingly, as an example term, the following may include both the lower and the upper directions. The element may be oriented in another direction, and accordingly, spatially relative terms may be interpreted according to the orientation.

An expression representing a part of a "part" or "part" used in the present invention means that the component may represent a device capable of including a specific function, software capable of including a specific function, or a combination of a device and software capable of including a specific function, but is not necessarily limited to the expressed function, and this is only provided to help a more general understanding of the present invention, and various modifications and modifications are possible from these descriptions to those of ordinary skill in the field to which the present invention belongs.

In addition, it should be noted that all electrical signals used in the present invention are, as examples, that when an inverter or the like is additionally provided in the circuit of the present invention, the signs of all electrical signals to be described below may be reversed. Therefore, the scope of the present invention is not limited to the direction of the signal.

Therefore, the spirit of this invention should not be limited to the described embodiments, and not only the claims to be described below but also all those with equivalent or equivalent variations to the claims belong to the scope of this invention.

The present invention can be divided into a first embodiment in which a particular user takes notes (hereinafter the term "note" is referred to as "memo") using his/her own memo processing device, stores them in his/her own memory, and search/views them, and a second embodiment in which the user and other users take notes, store them in a database via a remote server, and then share the stored notes with each other and search/views them.

In the following, the invention will be described in more detail with reference to the embodiments shown in the drawings.

FIG. 1 is a block diagram illustrating a memo processing device based on augmented reality according to a first embodiment of the present invention.

In the present embodiments, a memo processing device 10 may be a mobile device. Examples of a mobile device may include a mobile terminal device such as a smartphone and a cellular phone, or a Google Glass or head mounted display that is worn on a body such as a head. However, it is not limited to the above devices.

The mobile device 10 comprises a camera 11, a memo acquisition unit 12, a memo presentation unit 13, a captioning unit 14, a search unit 15, a memory 16, and a control unit 17.

The memo acquisition unit 12 performs the functions of taking notes (memos), specifying a subject to which the memo is to be attached using a keypoint extraction algorithm from the video filmed by the camera 11, and storing information about the designated subject and the notes taken in the memory 16. According to the present embodiment, the function of taking notes of the memo acquisition unit 12 and the function of providing the taken note to the subject may be performed through a user interface (UI).

The above keypoint extraction algorithm for specifying the subject may be a method for recognizing or identifying an object in a video, such as extracting a feature or point of interest. To extract a keypoint, keypoints must be easily readable despite changes in the shape or size of the subject, the position of the keypoint in the video, or changes in camera viewpoint or lighting. Examples of such keypoint extraction algorithms include Scale Invariant Feature Transform (SIFT), Oriented FAST and Rotated BRIEF (ORB), and Self Supervised Interest Point Detection and Description (SuperPoint).

The memo presentation unit 13 performs the function of displaying memos as as an overlay on the screen using a homography transformation characteristic calculated through a keypoint matching algorithm (e.g., Brute-force matcher, FLANN matcher, SuperGlue). Here, homography is a transformation relationship that is established when one plane is projected onto another plane and can be represented as a unique matrix. The memo presentation unit 13 may include a memo list composition part 13*a* and an overlay screen processing part 13*b*. The note list composition part 13*a* generates a note list before displaying the notes taken in the form of an overlay.

The captioning unit 14 performs image captioning of the subject of the video on which the note is taken. The information about image caption is used later by the search unit 15 to extract keywords for searching the memos. The image captioning refers to detecting various objects from the video and generating sentences or words describing an image.

The search unit 15 searches based on the content of the notes (memos) or the captioning of an image of the subject of the memos at a time desired by the user. The search unit 15 may comprise software that performs image captioning from videos filmed by a camera for taking notes and outputs text keywords corresponding to the images.

The memory 16 may be an internal memory of the mobile device 10 or a removable external memory. It stores various information such as images of the subject, memo content, keywords, and key points.

The control unit 17 controls the operations of the above configurations as well as the overall operation of the mobile device.

Figure 2:
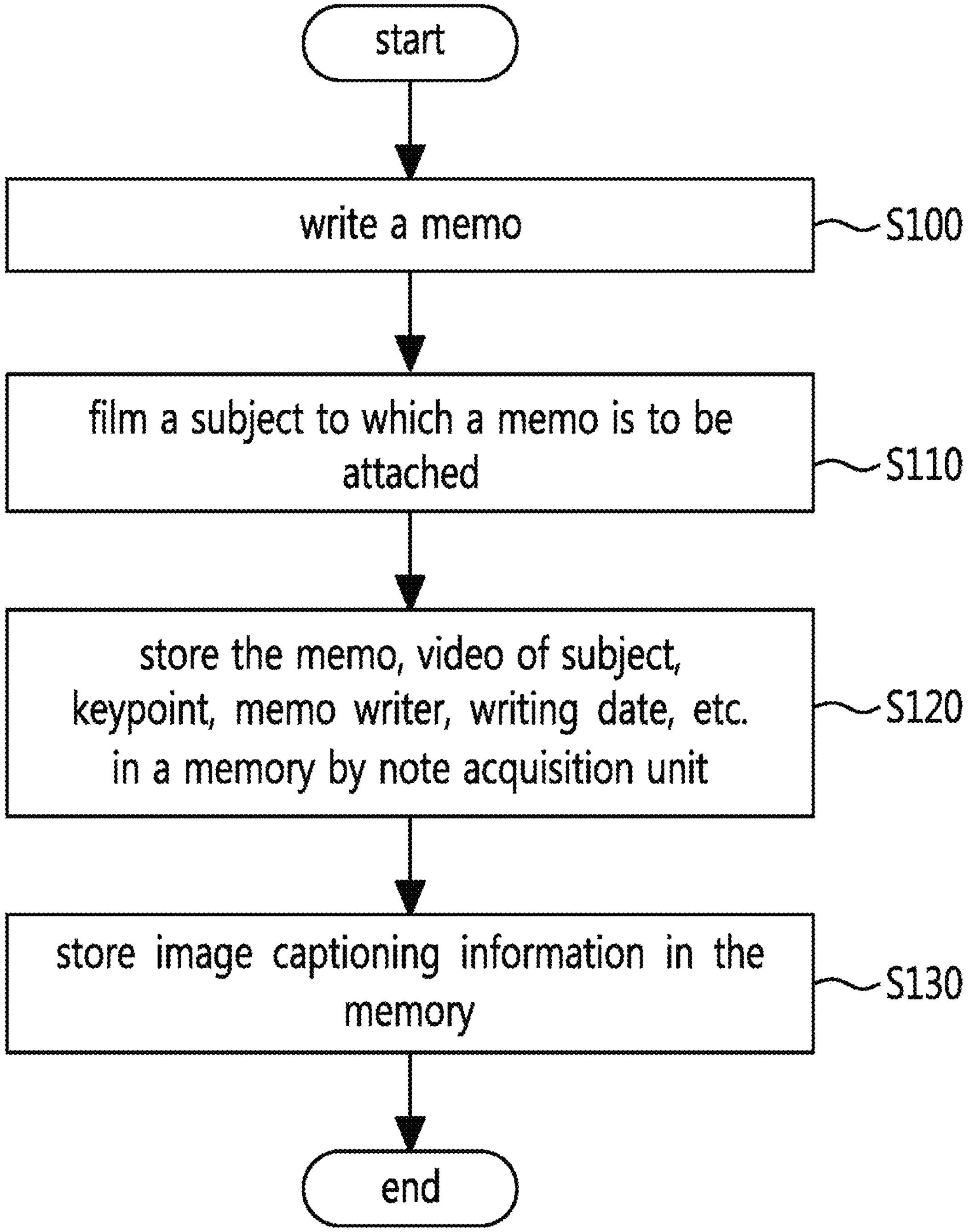
FIG. 2 is a flowchart illustrating the process of taking and storing notes (memos) using the memo processing device based on augmented reality of FIG. 1.

FIG. 2 is a flowchart illustrating the process of taking and storing notes (memos) using the memo processing device based on augmented reality of FIG. 1.

A mobile device user takes a note using the user interface of the memo acquisition unit 12 (S100). In this case, the note's content may consist of not only general text but also multimedia such as photos or videos.

The user then films the subject to which the note is to be attached (S110). The memo acquisition unit 17 then stores the content of the taken note, the video of the subject, and the keypoint information extracted from the video by the keypoint extraction algorithm in the memory 16. The embodiment uses software of a keypoint extraction algorithm such as ORB. Additionally, it is possible to store the note's author (memo writer) and writing date/time together (S120).

At this time, when the notes and the video of the subject are stored in the memory 16, the captioning unit 14 can caption an image of the subject video and store the related information together (S130).

Figure 3A:
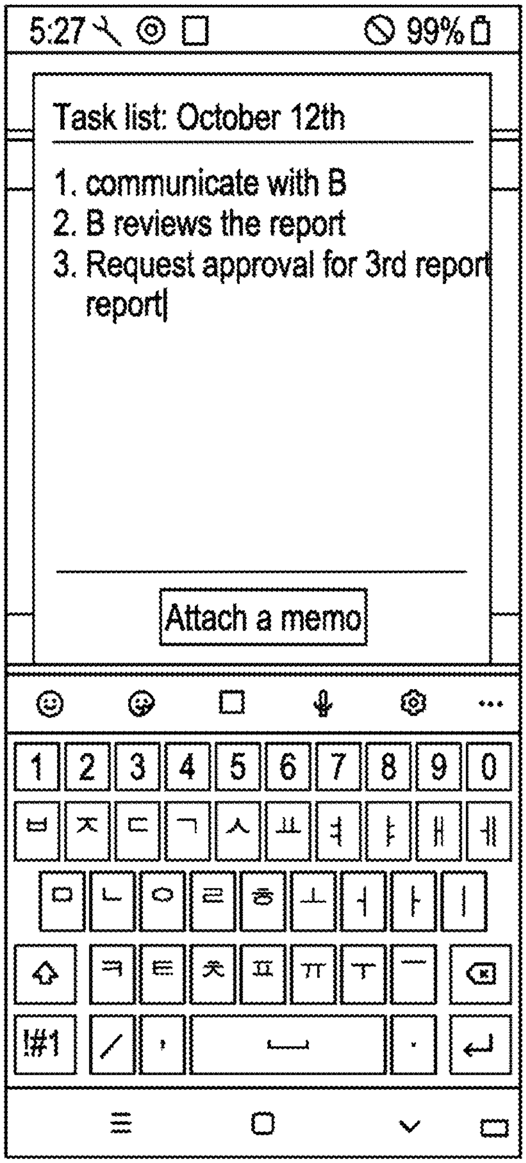
FIG. 3 is a diagram illustrating an example of the process of FIG. 2.
Figure 3B:
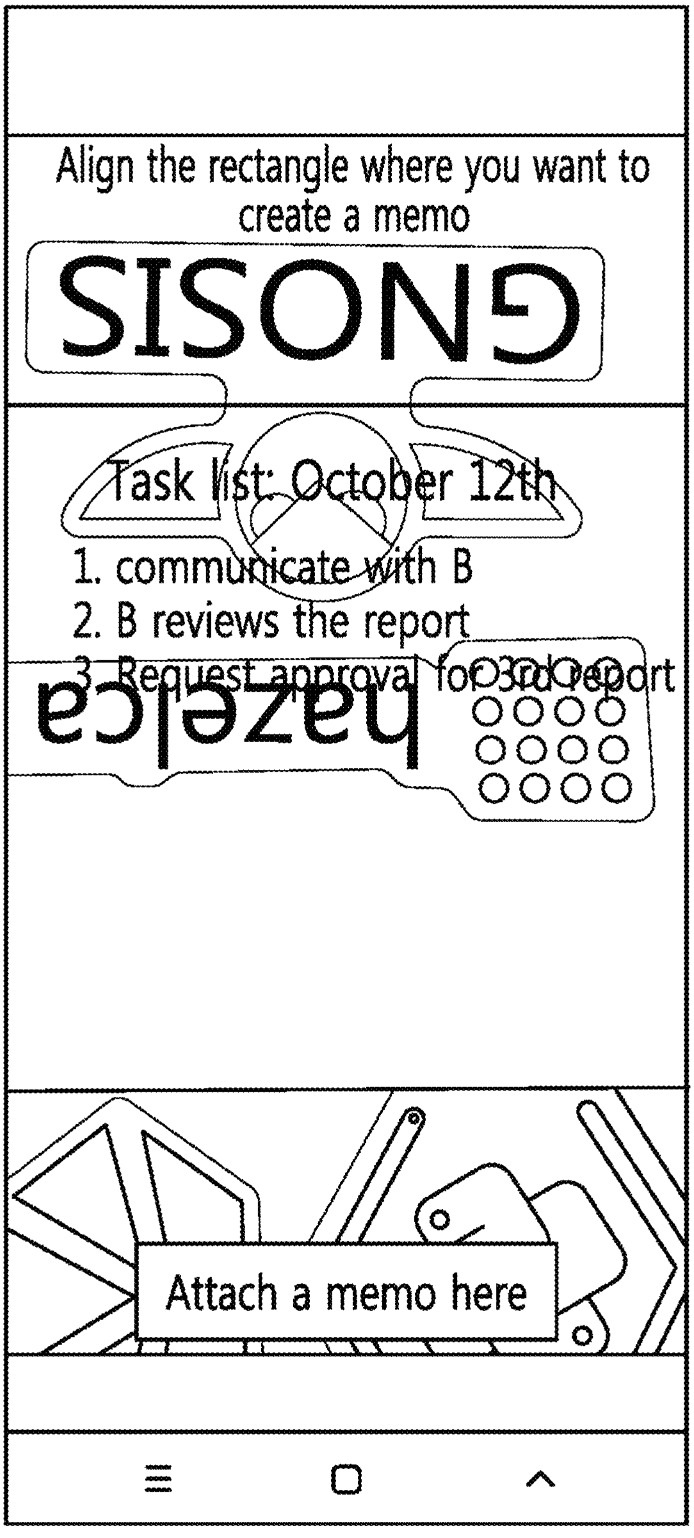

FIG. 3 are diagrams illustrating an example of the process of FIG. 2. FIG. 3A illustrates an example in which a note with textual content is taken using input means (e.g., a user interface) of the mobile device 10. FIG. 3B illustrates an example in which a subject to which the note is attached over a camera frame.

Figure 4:
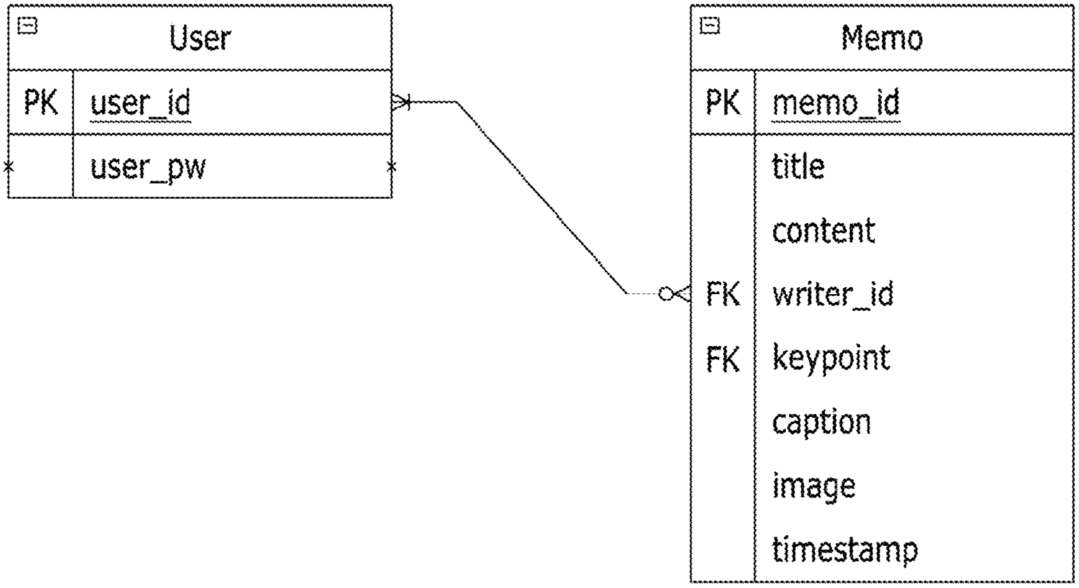
FIG. 4 is a diagram illustrating the relationship of the entities that configure a memory.

FIG. 4 is a diagram illustrating the relationship of the entities that configure a memory 16. Referring to FIG. 4, a memo (note) to be stored may include the note's title, content, writer, keypoint, and timestamp of the captioning result.

Furthermore, the process of taking and storing notes in FIG. 2 may be repeatedly performed according to the user's needs.

Figure 5:
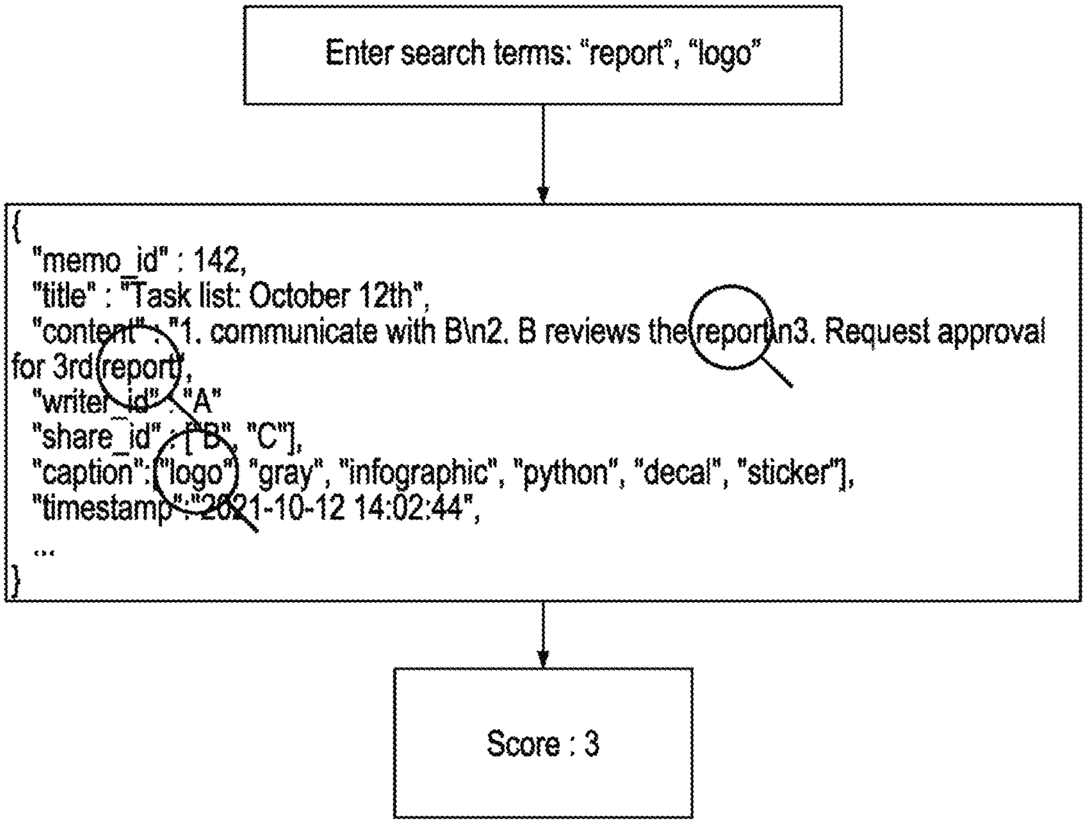
FIG. 5 is a diagram illustrating an example of a user's search.

The content of the note stored by the process shown in FIG. 2 can be viewed regardless of the place or location. In other words, the content stored in the memory 16 can be searched at the request of a user. FIG. 5 is a diagram illustrating an example of a user's search. Referring to FIG. 5, when searching for the words 'report' and 'logo', the user searches for the search terms among the stored notes, and score is displayed based on the frequency of the search terms. The search process can be performed by analyzing search terms and content at the morpheme level for efficient searching in Korean. In this way, storing and searching notes can be very highly advantageous in situations or context that rely on memory. Additionally, since the search for note content is done solely using the user's mobile device 10, there is no need for connection through a network with other media such as a server.

Since the present invention allows for leaving a written note specifying an object or subject, as shown in FIG. 2, it can also provide information about the location of an object or subject, which simple information-sharing methods such as messengers cannot offer. In other words, when not only the content of the note but also the location where the note is attached are important, such as a note indicating an exact location, at an industrial site, this information can be provided efficiently, as will be described in more detail with reference to FIGS. 6 and 7.

Figure 6:
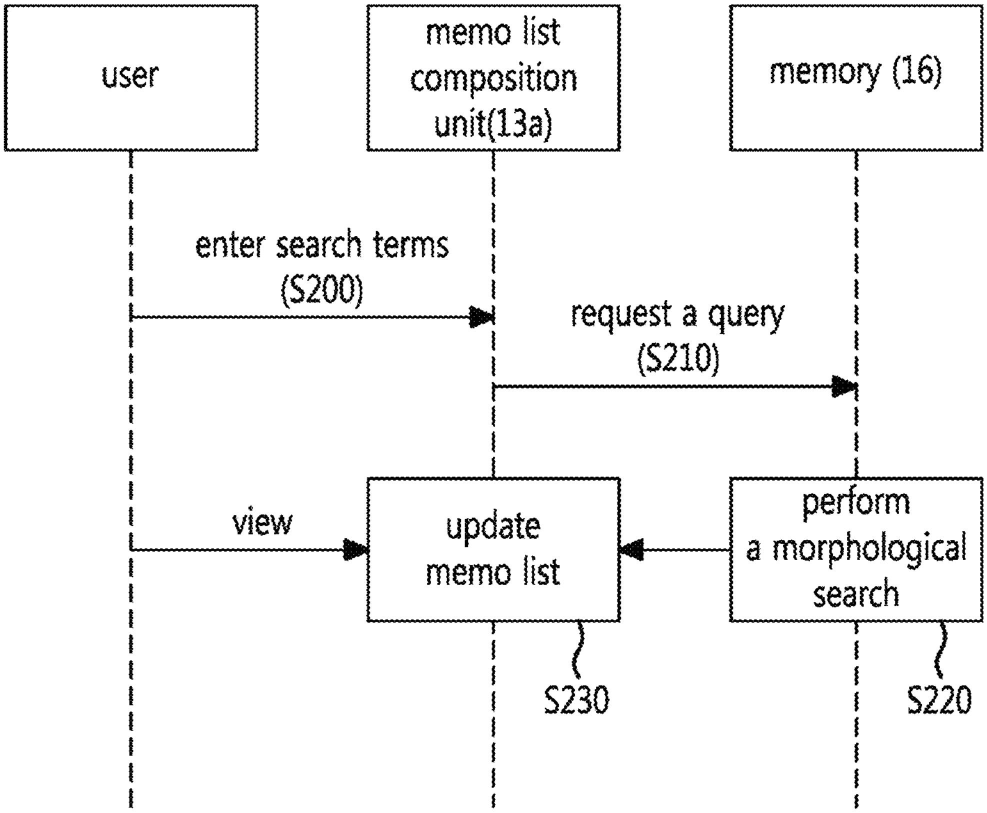
FIG. 6 is a flowchart illustrating a process for reconstructing a list of memos using the memo processing device based on the augmented reality of FIG. 1.

FIG. 6 is a flowchart illustrating a process for reconstructing a list of notes (memo list) using the memo processing device based on the augmented reality of FIG. 1. The memo presentation unit 13 of FIG. 1 may provide a memo list for viewing notes taken by a user.

As notes continue to be taken and saved on an as-needed basis, the memo list needs to be constantly updated.

Therefore, when a user enters a search term to organize the memo list (S200), the memo list composition part 13*a* accesses the memory 16 to request for collecting information (S210). Then, the note list composition part 13*a* performs a search by morphological level analysis on the content of the note stored in the memory 16 (S220), and updates and reorganize the note list according to the result of search (S230). The user can view the reorganized note list.

Figure 7:
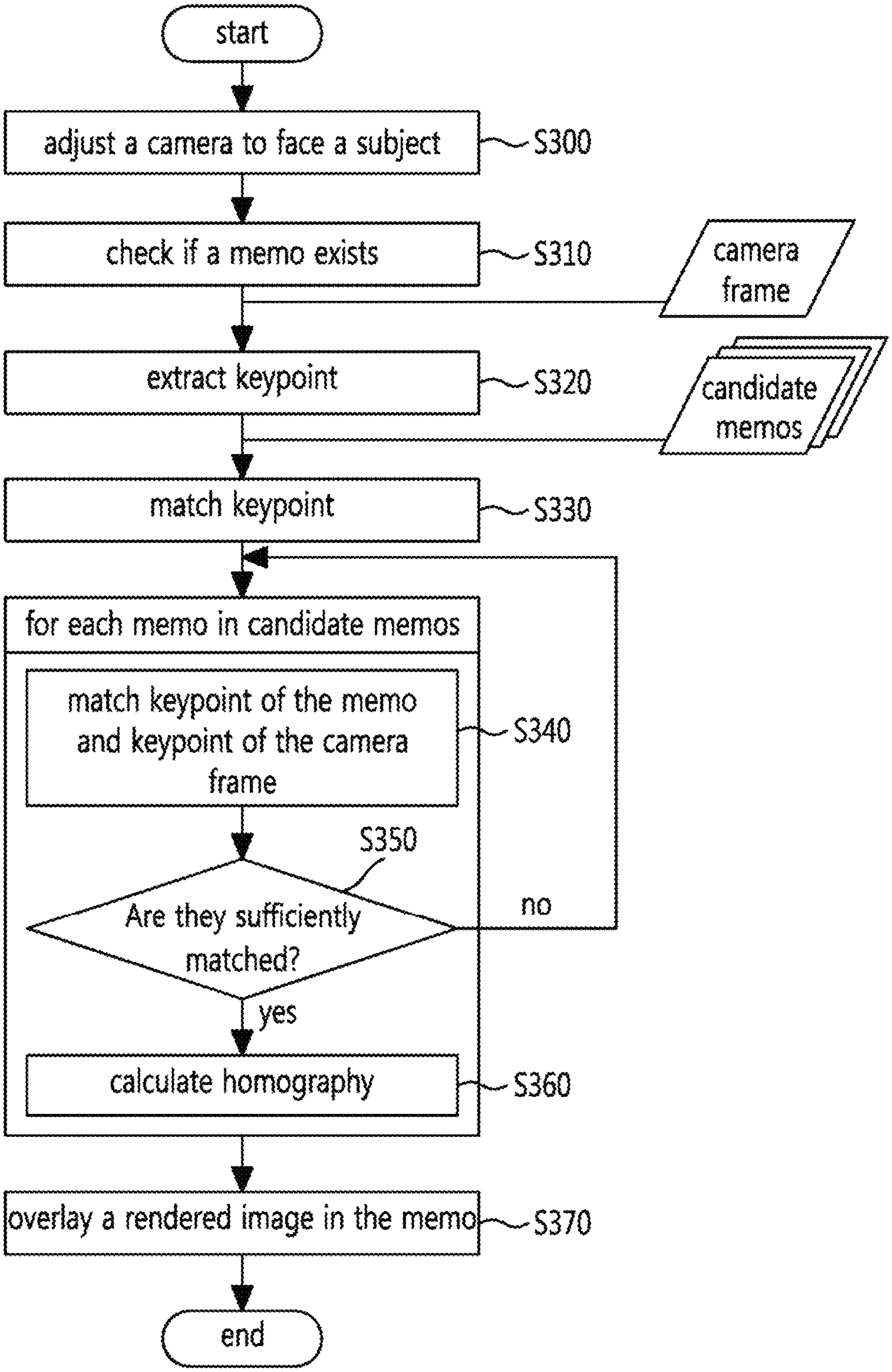
FIG. 7 is a flowchart illustrating a process for displaying an overlay screen of a stored memo by the memo processing device based on augmented reality of FIG. 1.

FIG. 7 is a flowchart illustrating a process for displaying an overlay screen of a stored note by the memo processing device based on augmented reality of FIG. 1.

To view the notes taken by the user on an overlay screen, the camera 11 is set to face the subject (S300). The presence of the note (i.e., memo) can then be confirmed (S310) at the point currently viewed by the camera 11. The presence of the memo can be confirmed by extracting keypoints of the video which corresponds to the camera frame (S320) and matching them with keypoints in all possible candidate notes by using a keypoint matching algorithm (S330).

If a keypoint of the camera frame and a keypoint of one of the candidate notes match according to the matching process (S340), and if the matching information is greater or equal to a predetermined threshold (as exemplified in S350), the memo presentation unit 13 calculates the homography between the two keypoints (S360) and displays the rendered image of the note on the overlay screen (S370). In this case, it can be said that the rendered note content is ultimately displayed in an augmented reality (AR) manner, as the position and angle attached to the subject at the time of taking notes are faithfully reproduced and displayed on the screen.

Figure 8:
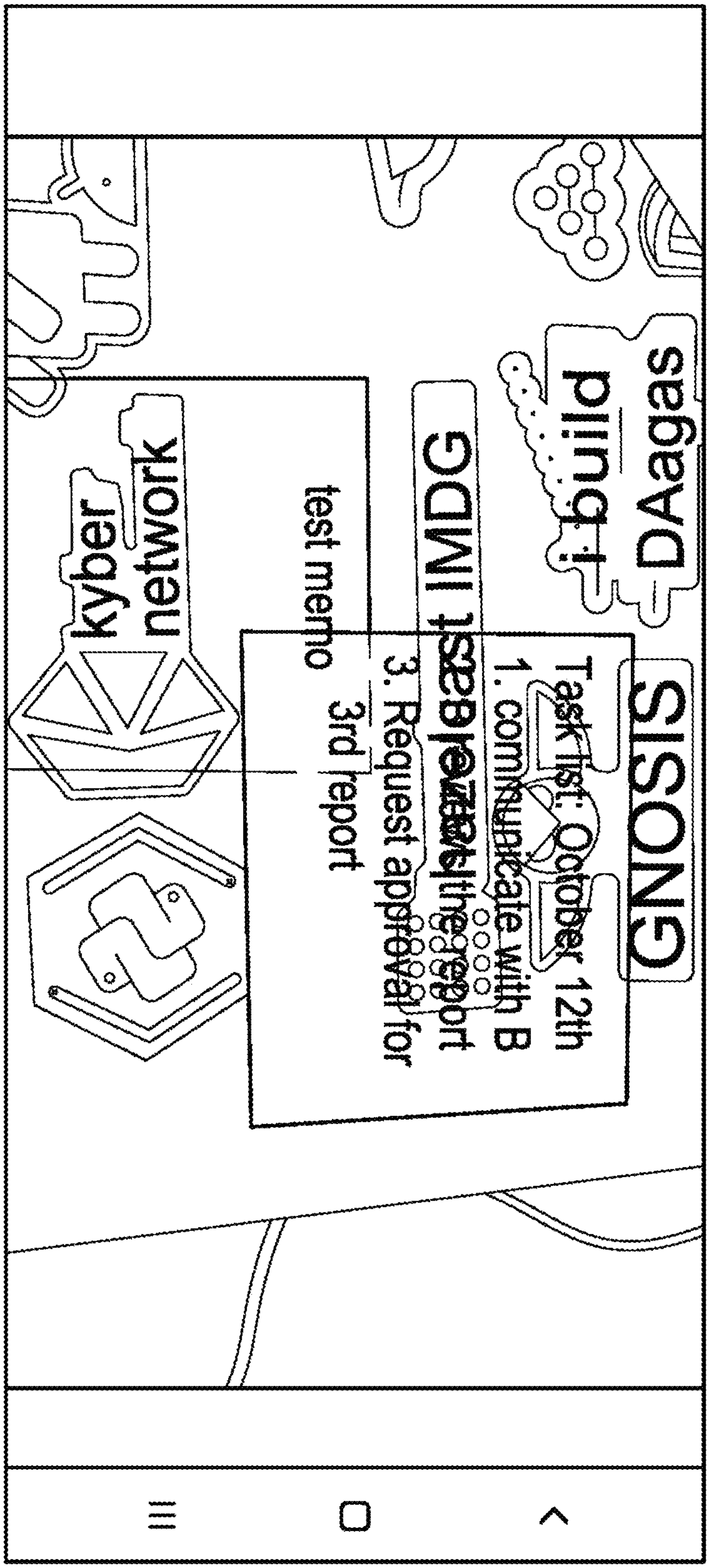
FIG. 8 is a diagram illustrating an example of the overlay screen illustrated in FIG. 7.

FIG. 8 is a diagram illustrating an example of the above overlay screen. FIG. 8 illustrates an overlay screen where a projection transformation using homography when the camera 11 is facing a subject with the attached memo by rotating about 90° counterclockwise and a rendered image in which a memo is rotated clockwise are overlaid with augmented reality. In FIG. 8, there are a total of two notepads (i.e., two memos) attached to the overlay screen.

Figure 9:
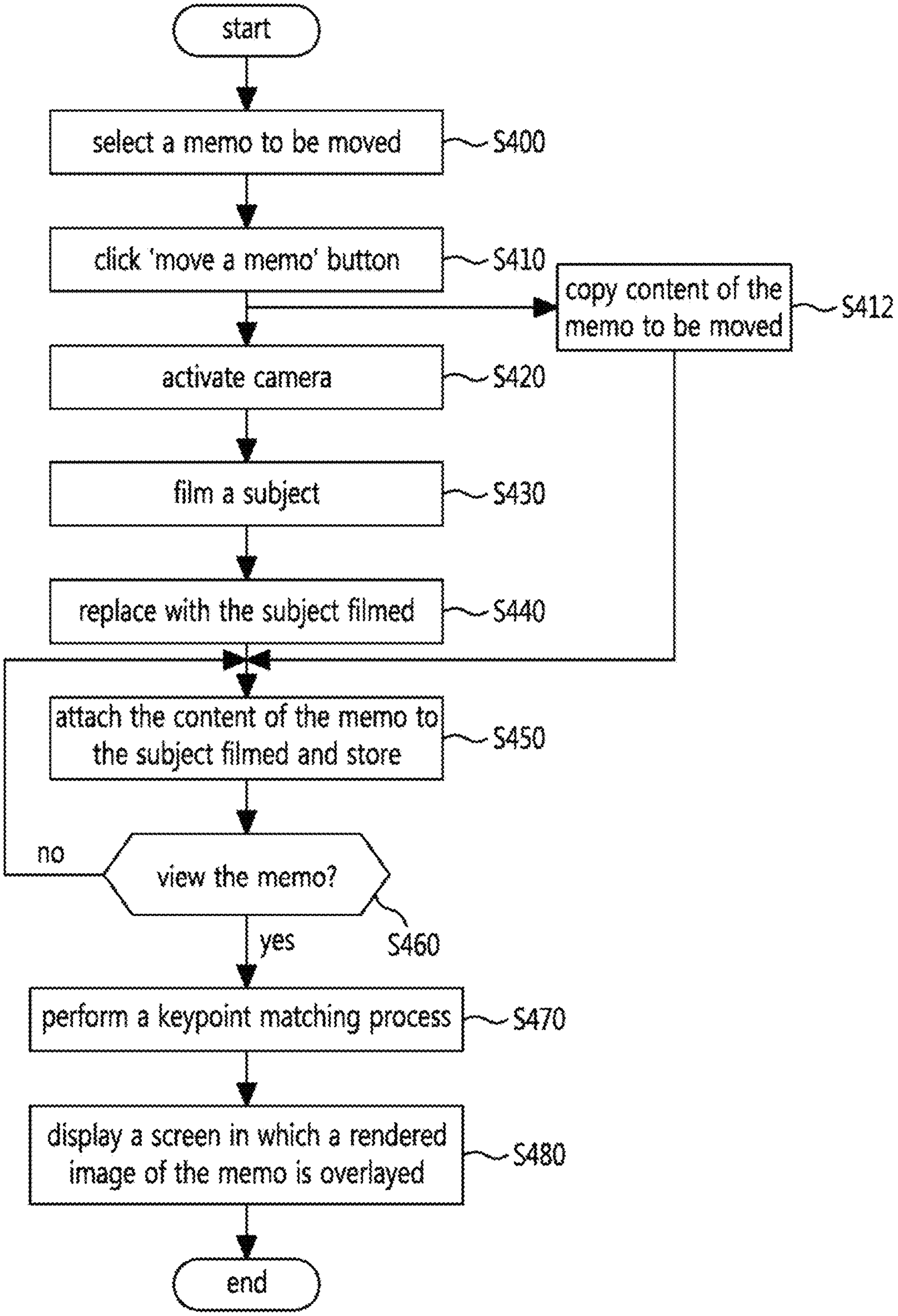
FIG. 9 is a flowchart illustrating the functions of moving and attaching of memos created by the memo processing device based on augmented reality of FIG. 1.

FIG. 9 is a flowchart illustrating the function of moving and attaching function notes (i.e., memos) created by the note processing device based on augmented reality of FIG. 1. As mentioned above, a memo is attached to a designated subject, and this embodiment may provide the ability to move and attach the attached memo to another subject.

Referring to FIG. 9, the user selects a memo to be moved from the stored memos (S400). Although not shown, each stored memo has a Move button and a Delete button. Thus, clicking the Delete button deletes the memo.

To move a memo, the user clicks the Move button (S410). Then, a camera is activated to film the subject (S420), and the content to be moved can be temporarily copied (S412).

The user then films a subject, which is an object to which he/she intends to move the memo (S430). Once the subject is filmed, the new subject is substituted for a previously stored subject in the memory 16 of the mobile device 10 or in a database of a remote server as will be described below (S440). The memo attached to the previously stored subject is then moved and attached to the new subject, and the image of the subject with the memo is stored in the memory 16 or database (S450).

Subsequently, the memo stored by the function of moving and attaching can be viewed (S460). When viewing the memo, the keypoint matching process, as earlier described with reference to FIG. 7, is performed (S470), and as a result of this process, the rendered image of the memo is displayed overlaid on the screen. At this time, the memo has been moved to a new subject (S480), so the keypoint matching process of FIG. 7 will be performed on the subject to which the note has been moved.

MODE FOR IMPLEMENTATION OF THE INVENTION

A second embodiment of the present invention will now be described. Compared to the first embodiment described above, the second embodiment differs only in that a remote server is further configured. The remote server is configured to allow a second user (which may be a first user) to view a memo created by a first user (or a second user) while sharing the memo by the second user (which may be a first user). Compared to the configuration of the first embodiment, the configuration of the mobile device is the same, so the description will focus on the configuration of the remote server.

Figure 10:
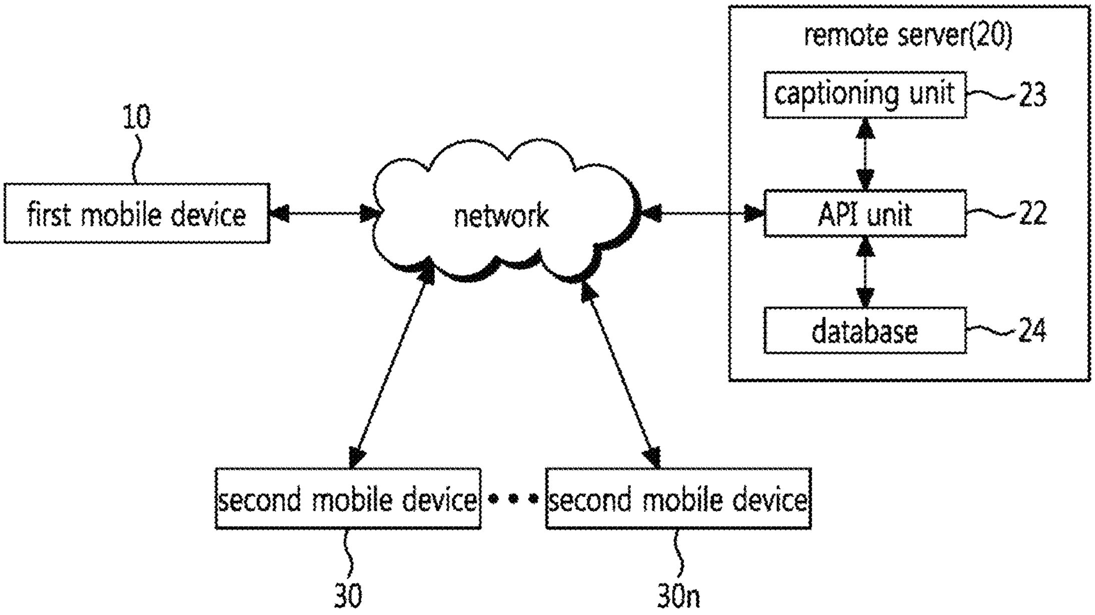
FIG. 10 is a block diagram of a memo processing system including a memo processing device based on augmented reality according to a second embodiment of the present invention.

FIG. 10 is a block diagram of a memo processing system including a memo processing device based on augmented reality according to a second embodiment of the present invention.

Referring to FIG. 10, a system includes a first mobile device 10 of a first user, a remote server 20, and second mobile devices 30 to 30*n* of a plurality of second users.

The mobile devices 10, 30 to 30*n* comprise a camera 11, a memo acquisition unit 12, a memo presentation unit 13, and a search unit 15, described with reference to FIG. 1, and these configurations are omitted as they are the same as in the first embodiment. The second embodiment does not utilize the mobile devices 10, 30 to 30_n_'s own memory, but instead utilizes the database 24 of the remote server 20. This does not mean that the mobile devices 10, 30-30_n_ are not equipped with a memory.

The remote server 20 communicates with the mobile devices 10, 30~ 30_n_ using a wired or wireless communication network, and comprises an API unit 22, a captioning unit 23, and a database 24.

The API 22 communicates with the mobile devices 10, 30 to 30_n_, and the present embodiment is configured to communicate via application layer protocols such as HTTP/HTTPS and transport layer security such as SSL/TLS.

The captioning unit 23 performs image captioning on the video filmed and transmitted by the first mobile device 10 when taking notes, and extracts and provides text keywords in response to a search request from the search unit of the second mobile devices 30 to 30_n_. In the present embodiment, the captioning unit 23 may be configured with an artificial neural network technology such as a convolutional neural network (CNN) or a recurrent neural network (RNN).

The database 24 functions to efficiently store and manage the content of memos transmitted by the mobile devices 10, 30 to 30_n_. In this embodiment, the database may be a relational database such as Maria DB.

Figure 11:
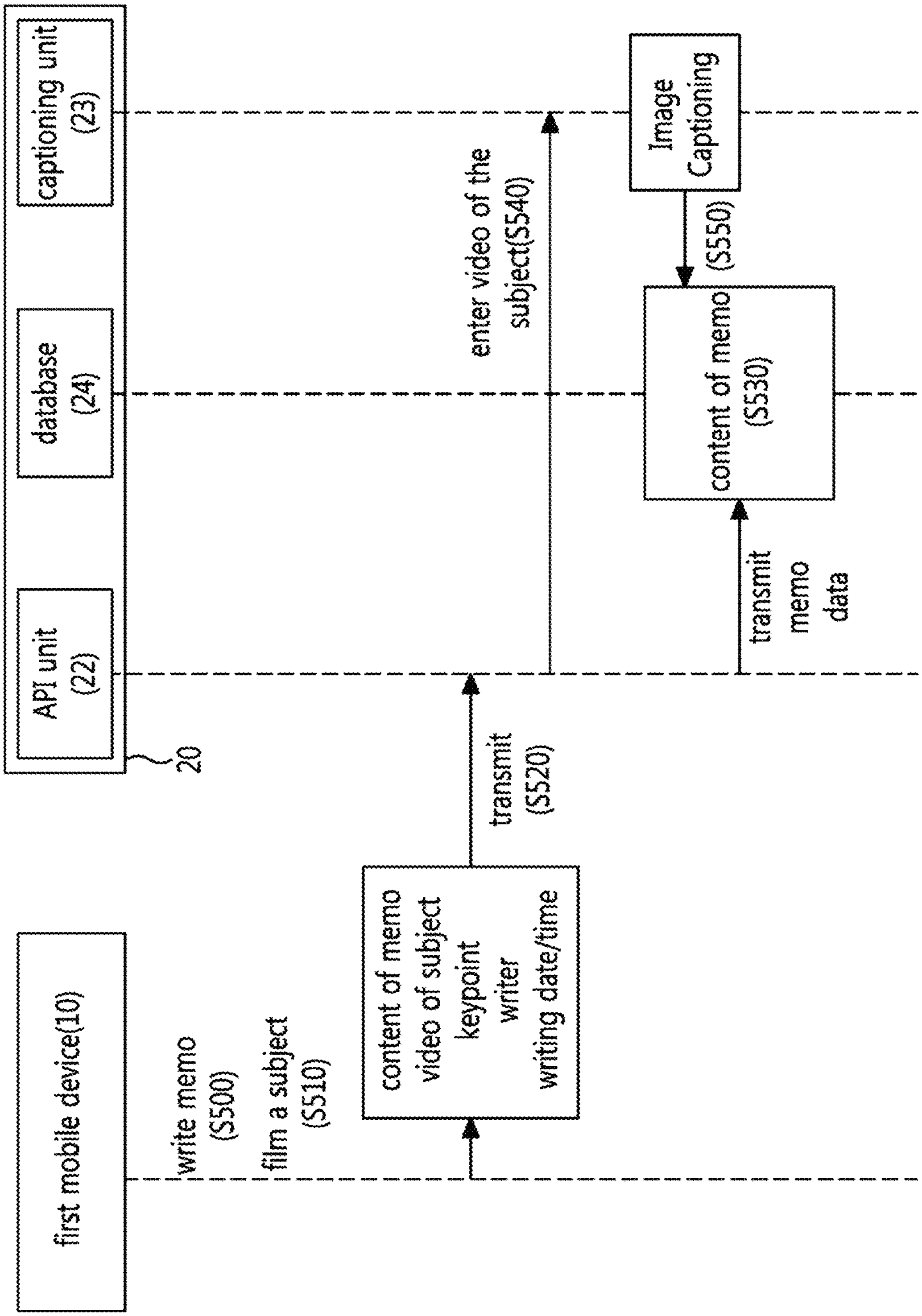
FIG. 11 is a flowchart illustrating the process of a first user taking and storing a note using the memo processing system based on augmented reality of FIG. 10.

FIG. 11 is a flowchart illustrating the process of a first user taking and storing notes (i.e., memos) using the memo processing system based on the augmented reality of FIG. 10.

The user of the first mobile device 10 takes a note using the user interface of the memo acquisition unit 12 (S500). The content of the note (i.e., memo) may be not only general text but also multimedia such as a photo or video. Then, the user films a subject to which the memo is to be attached (S510). Then, data about the note (referred to as 'memo data'), comprising the content, the video of the subject, the note's author (referred to as the memo's writer) and the date and time of note creation, and information regarding keypoints extracted from the video through the keypoint extraction algorithm, is transmitted to the remote server 20 (S520).

The remote server 20 then stores the memo data transmitted via the API unit 22 in the database 24 (S530). The captioning unit 23 receives the video of the subject (S540), performs image captioning, and stores related information together (S550). Thus, the database 24 stores the memo data transmitted by the first mobile device 10.

Figure 12:
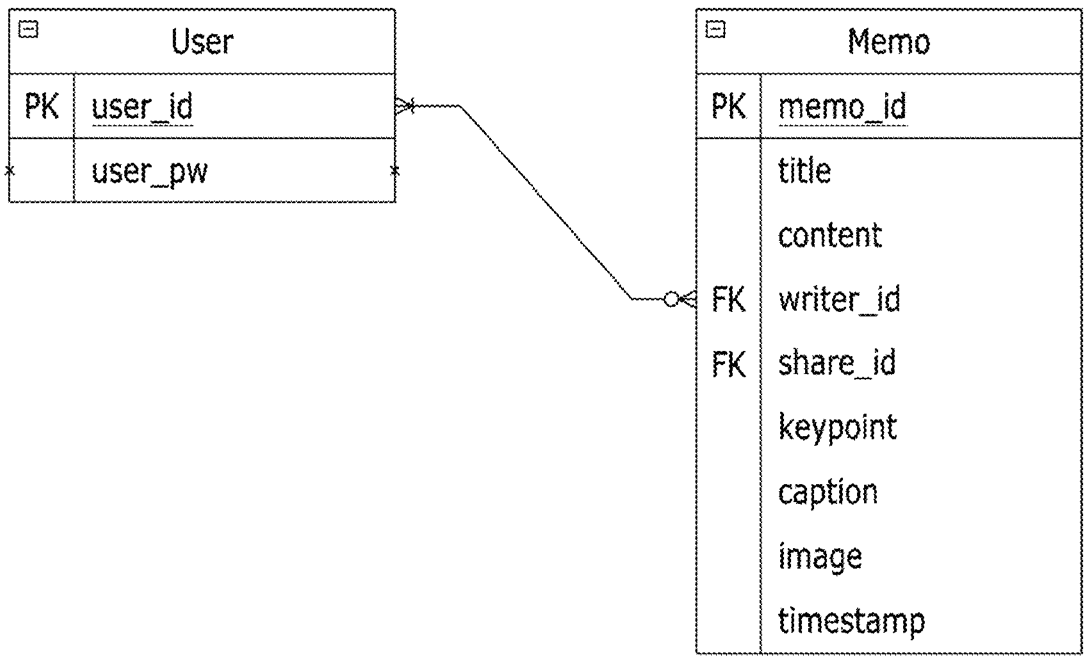
FIG. 12 is a diagram illustrating the relationship of entities configuring a memory, according to a second embodiment.

FIG. 12 is a diagram illustrating the relationship of entities configuring a memory, according to a second embodiment. Compared to FIG. 4 of the first embodiment, the second embodiment further includes information about a person that can share (share_id) memo data.

Figure 13:
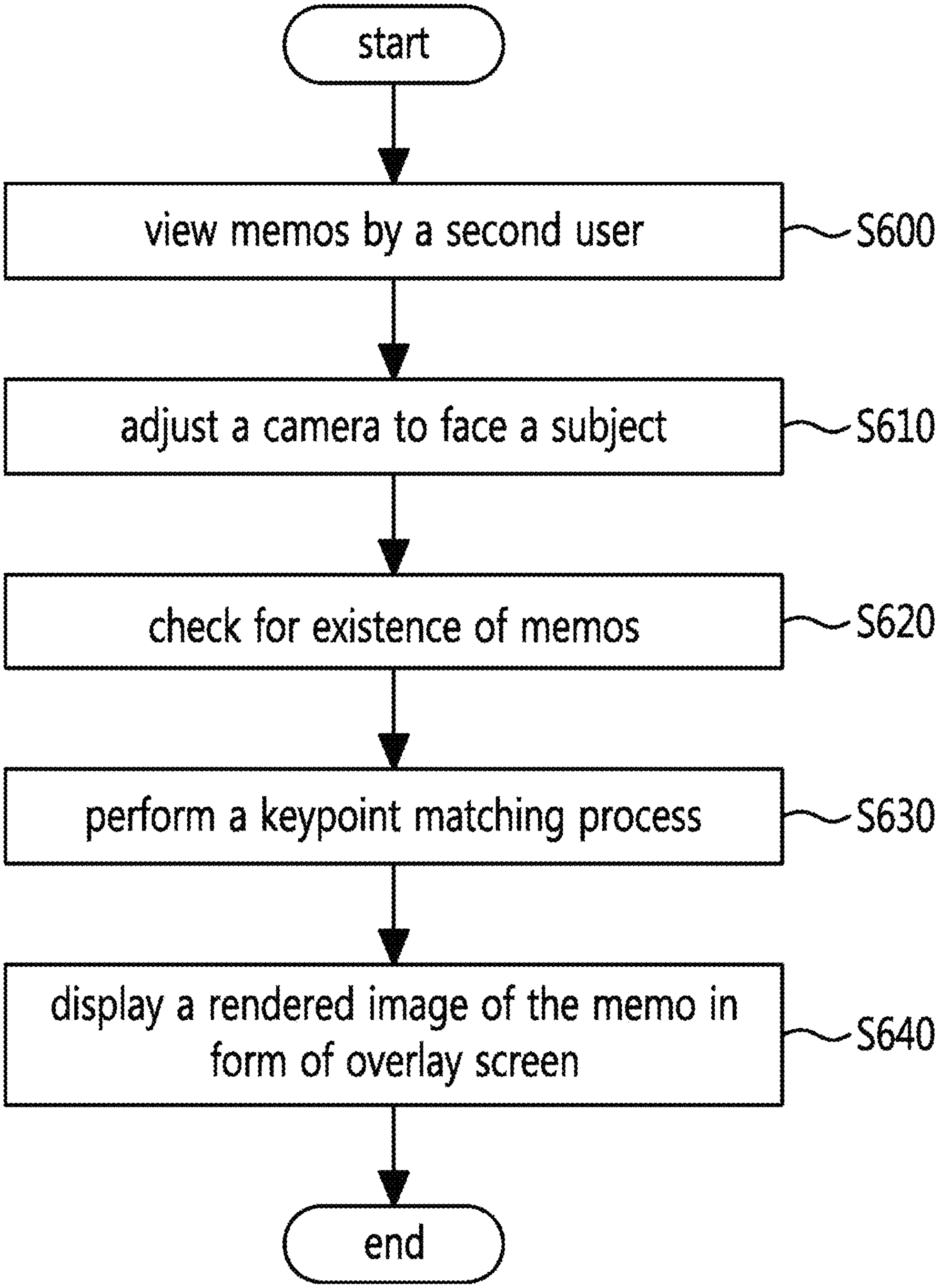
FIG. 13 is a flowchart illustrating a process for displaying an overlay screen of a note (memo) taken by a first user by a second user using his or her second mobile devices, according to a second embodiment.

FIG. 13 is a flowchart illustrating a process for displaying an overlay screen of a note taken by a first user by a second user using his or her second mobile devices 30 to 30_n_, according to a second embodiment.

To view the memos of a designated subject (S600), the second user adjusts the camera of the second mobile device 30 to face the subject (S610).

The memo presentation unit 13 of the second mobile device 30 then communicates with the remote server 20 to determine the presence of memo data at the point currently faced by the camera (S620). The confirmation of the presence of memo data may be confirmed by the keypoint matching process with reference to FIG. 7 (S630). That is, the keypoints of the image corresponding to the camera frame are extracted, and the keypoints of all possible candidate memos are matched by the keypoint matching algorithm. According to this matching process, if the keypoint of the camera frame and the keypoint of one of the candidate notes match, and match value is greater than or equal to a predetermined threshold, the homography between the two keypoints is calculated.

In this process, the second user can overlay the rendered image of the memo on his or her own mobile device 30 and view it directly. In this case, it can be said that the content of the rendered memo is ultimately displayed in an augmented reality (AR) manner, as the position and angle attached to the subject at the time of taking notes are faithfully reproduced and displayed on the screen.

While the second embodiment described above describes an example of providing data of notes taken by a first user to the remote server 20 and viewing the note data by a second user, it is also possible for a first user (or a second user) to store note data on the remote server 20 using his/her mobile device and view the stored memo data on an overlay screen. In other words, the same user can utilize the database of the remote server instead of the memory of the mobile device.

As described above, it can be seen that the present invention enables a user to take a note and store it together with the image of a desired subject without using a conventional paper note pad, and to view the stored note content if necessary, or to view the memo and the image of the subject to which the note is attached based on augmented reality.

While embodiments of the present invention utilize an ORB algorithm to extract keypoints from the image and a Brute-force match and Loew's Ratio test to compare the keypoints extracted from the image at the time of note taking and the keypoints extracted from the image at the time of note viewing, the present disclosure may be applied in other ways. For example, SuperPoint could be used to extract keypoints, and NN match and GPU acceleration could be used.

While the above has been described with reference to the illustrated embodiments of the invention, they are exemplary only, and it will be apparent to one having ordinary skill in the art to which the invention belongs that various modifications, changes, and equivalents are possible without departing from the spirit and scope of the invention. The true scope of technical protection of the invention should therefore be determined by the technical ideas of the appended claims.

INDUSTRIAL APPLICABILITY

This disclosure may be applied to paperless digital note-taking systems and more.

What is claimed is:

1. A memo processing device based on augmented reality, comprising:
   - a camera that films a video;
   - a user interface that specifies a subject to which a memo is to be attached in the filmed video and stores the subject and the memo in a memory; and
   - a controller displays the memo stored in the memory in an overlay form when the camera faces the subject, wherein
   - the controller further:
     - uses a keypoint matching algorithm,
     - calculates a homography if a degree of matching between a keypoint in a camera frame and a keypoint in one of candidate memos is greater than or equal to a threshold value when the camera faces the subject, and then displays an image rendered of the memo as an overlay on a screen.

2. The memo processing device of claim 1, wherein the controller:

performs image captioning of a video of the subject to which the memo is attached; and searches content of the memo or captioned images.

3. The memo processing device of claim 1, wherein the user interface specifies the subject using a keypoint extraction algorithm.

4. The memo processing device of claim 1, wherein the controller:

composes a list of memos, and displays the memo as the overlay.

5. The memo processing device of claim 1, wherein the memo comprises a move button, and upon execution of the move button, the memo is attached to a video of a newly filmed subject.

6. The memo processing device of claim 1, wherein the memory is an internal memory provided in a mobile device or an external memory removably attached to the mobile device.

7. The memo processing device of claim 1, wherein a mobile device includes a smartphone, google glass, and a head-worn display.

8. A memo processing method of, based on augmented reality, writing a memo by a mobile device, and copying and viewing the memo, the method comprising:

attaching a memo to a designated subject filmed by the mobile device and storing in a storage; and displaying the memo stored in the storage as an overlay when the mobile device faces the subject, wherein a subject to which the memo is to be attached is specified using a keypoint extraction algorithm, the memo is displayed on a screen using a keypoint matching algorithm, and the displaying of the memo on the screen comprises:

matching a keypoint in a camera frame with a keypoint in one of candidate memos when the camera of the mobile device faces the subject;

determining if a degree of the matching is greater than or equal to a predetermined threshold;

calculating, if the degree is greater than or equal to the predetermined threshold, a homography between the keypoint in the camera frame and the keypoint in one of the candidate memos; and displaying an image rendered of the memo as the overlay on the screen according to a result of the calculation.

9. The memo processing method of claim 8, wherein the storage is a memory provided in the mobile device or a database provided in a remote server, the method further comprises:

when a video of the subject to which the memo is attached is stored in the database, displaying as an overlay screen on the screen while sharing the memos stored in the database by another mobile device.

10. The memo processing method of claim 8, further comprising:

performing image captioning of a video of the subject to which the memo is attached.

11. The memo processing method of claim 8, further comprising:

moving and attaching the memo attached to the designated subject to another subject.

* * * * *